Sept. 11, 1945.　　　G. G. EPPLEY　　　2,384,539
QUIZ BOARD
Filed Sept. 18, 1943　　2 Sheets-Sheet 1
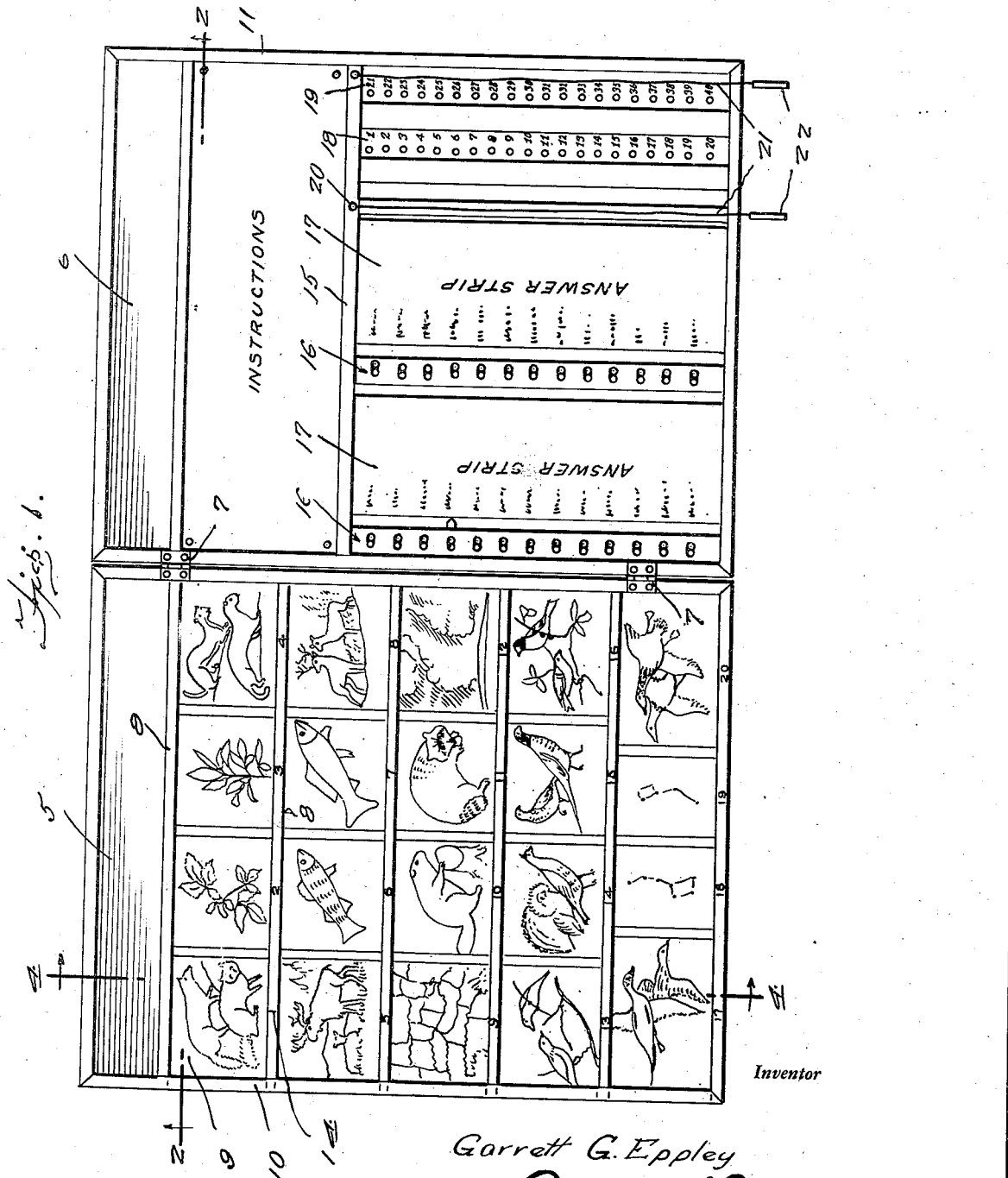
Inventor
Garrett G. Eppley
By Clarence A. O'Brien
and Harvey B. Jacobson
Attorneys Sept. 11, 1945.   G. G. EPPLEY   2,384,539
QUIZ BOARD
Filed Sept. 18, 1943   2 Sheets-Sheet 2
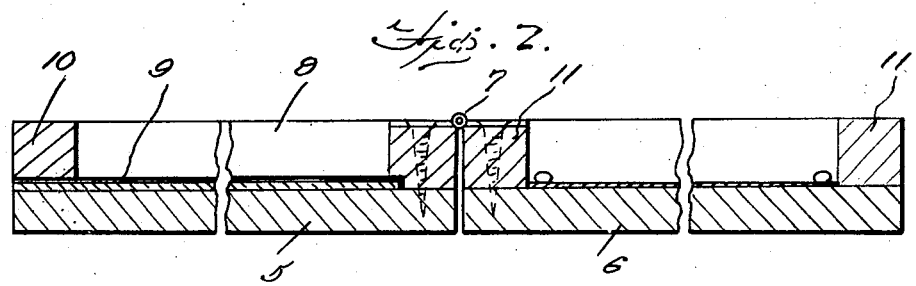
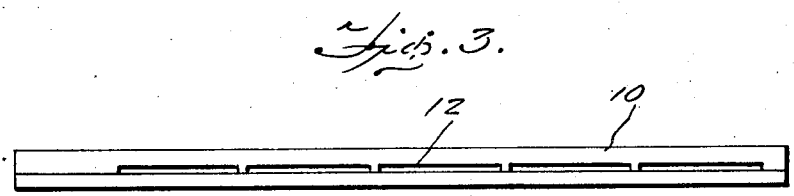
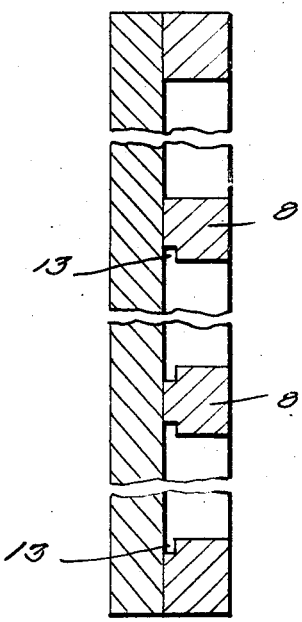
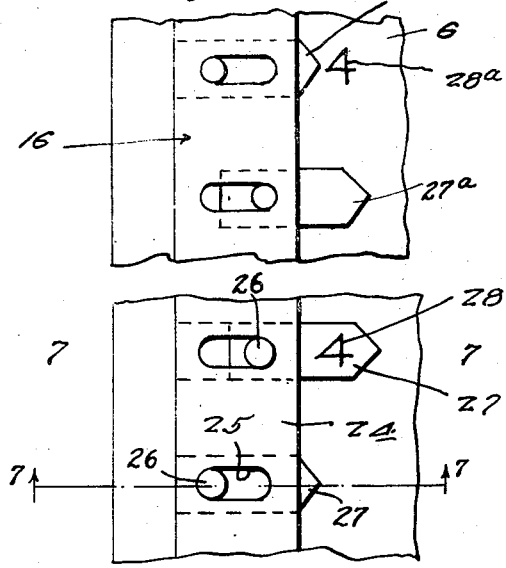
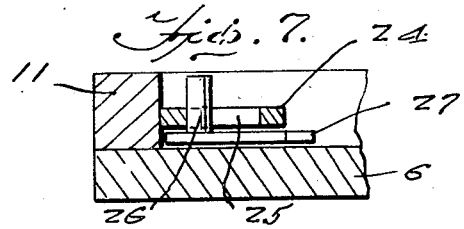
Inventor
Garrett G. Eppley
By Clarence A. O'Brien
and Harvey B. Jacobson
Attorneys Patented Sept. 11, 1945

2,384,539

UNITED STATES PATENT OFFICE 2,384,539

QUIZ BOARD

Garrett G. Eppley, Chappaqua, N. Y.

Application September 18, 1943, Serial No. 502,990

1 Claim. (Cl. 35—22)

This invention appertains to new and useful improvements in quiz devices and more particularly to a board for testing the intelligence of children and grown-ups.

The principal object of the present invention is to provide a quiz board which will serve to display a number of characters on the one hand, and on the other a list of definitions or names of these characters with selector means therefor.

Another important object of the invention is to provide a quiz device whereby answers can be readily selected.

Other objects and advantages of the invention will become apparent to the reader of the following description.

In the drawings:

Figure 1 represents a front elevational view of the quiz board in open position.

Figure 2 is a section on the line 2—2 of Figure 1 (fragmentary).

Figure 3 is an edge elevational view looking at the left end in Figure 1.

Figure 4 is a section on the line 4—4 of Figure 1.

Figure 5 is a fragmentary elevational view showing one form of selector means.

Figure 6 is a fragmentary elevational view showing a second form of selector means.

Figure 7 is a fragmentary detailed sectional view taken substantially on the line 7—7 of Figure 5.

Referring to the drawings wherein like numerals designate like parts, it can be seen that the device consists of two boards 5, 6 hinged together as at 7, the board 5 having a plurality of parallel cleats 8 spaced apart to receive pictures or other characters 9. As is apparent in Figure 1, the board 5 has a frame 10 at its perimeter, while the board 6 has a frame 11 at its perimeter. The frame 10 at its side edge is formed with a plurality of slots 12 to the end that the pictures 9 can be easily slid into position between the cleats 8 with their edge portions riding in grooves 13 located in said cleats 8.

The cleats 8 have numbers 14 thereon for identifying the various pictures, it being preferable that the pictures on the board 5 be consecutively numbered.

The board 6 has a cross cleat 15 between which and the bottoms of frame 11 are selector devices 16, 16 and removable definition or answer strips 17, 17. Further, between the cleat 15 and the bottom of the frame 5 are score keeping cleats 18, 19 each formed with a plurality of longitudinally spaced openings which are preferably numbered from 5 to 100.

Suitable anchoring elements 20 are provided on the cleat 15 and from these extend strings or cords 21 each having a peg 22 at its opposite end which can be inserted into the proper score opening of the corresponding score keeping cleat 18 or 19.

The selector devices 16 may be as shown in Figure 5 or in Figure 6.

As can be seen in Figure 5, the selector device consists of an elongated strip 24 having transverse slots 25 therein through which finger engageable pins 26 project from pointed slides 27. The slides in the form of the invention shown in Figure 5 actually carry numerals 28 corresponding to the identifying numerals of the pictures 9, while in the form of the selector shown in Figure 6 the numerals are located on the board 6 and are denoted by reference character 28a, while the slides 27a act as covers for the numerals 28a.

Obviously, a person will start with picture number 1. If he feels that the picture depicts fox, he will look down the answers strip or strips until he comes to that definition whereupon he will actuate the corresponding selector device to expose the number thereof in order that he may score himself and proceed to the next picture.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

Apparatus of the class described comprising a board structure, a plurality of pictures of different objects mounted on the board for designation by name by the players, a panel bearing the names of the objects arranged in column formation for selection by the players at random, and a vertical row of selector slides opposite the names in the columns, respectively, mounted for retraction into hidden position and for projection into visible position to indicate selected names, the board bearing symbols opposite the pictures for distinctively identifying each from the other, and said slides opposite the names of the objects bearing symbols corresponding to those distinguishing the pictures whereby projected slides may be checked with the symbols identifying the pictures to verify the objects for which the names are selected.

GARRETT G. EPPLEY.